(12) United States Patent
Majeti et al.

(10) Patent No.: US 11,327,995 B2
(45) Date of Patent: May 10, 2022

(54) COMPLEX DATA TYPE ENCODING WITHIN COLUMNAR DATABASE

(71) Applicant: MICRO FOCUS LLC, Santa Clara, CA (US)

(72) Inventors: Deepak Majeti, Pittsburgh, PA (US); Natalya Aksman, Cambridge, MA (US); James Clampffer, Pittsburgh, PA (US); Stephen Gregory Walkauskas, Pittsburgh, PA (US)

(73) Assignee: MICRO FOCUS LLC, Santa Clara, CA (US)

( * ) Notice: Subject to any disclaimer, the term of this patent is extended or adjusted under 35 U.S.C. 154(b) by 284 days.

(21) Appl. No.: 16/567,954

(22) Filed: Sep. 11, 2019

(65) Prior Publication Data
US 2021/0073241 A1    Mar. 11, 2021

(51) Int. Cl.
*G06F 16/25* (2019.01)
*G06F 16/2453* (2019.01)
*G06F 16/22* (2019.01)

(52) U.S. Cl.
CPC .......... *G06F 16/258* (2019.01); *G06F 16/221* (2019.01); *G06F 16/2453* (2019.01)

(58) Field of Classification Search
CPC ... G06F 16/258; G06F 16/221; G06F 16/2453
See application file for complete search history.

(56) References Cited

U.S. PATENT DOCUMENTS

| | | | |
|---|---|---|---|
| 5,799,310 A * | 8/1998 | Anderson | G06F 16/284 |
| 9,846,567 B2 | 12/2017 | Kaushik | |
| 10,552,443 B1 * | 2/2020 | Wu | G06F 16/258 |
| 2013/0132371 A1 * | 5/2013 | Bharath | G06F 16/24542 |
| | | | 707/719 |
| 2016/0034530 A1 * | 2/2016 | Nguyen | G06F 16/2471 |
| | | | 707/719 |
| 2017/0293469 A1 * | 10/2017 | Attaluri | G06F 16/221 |
| 2017/0371926 A1 | 12/2017 | Shiran et al. | |
| 2018/0089261 A1 * | 3/2018 | Li | G06F 16/2456 |
| 2018/0144004 A1 | 5/2018 | Bedi et al. | |
| 2018/0173771 A1 | 6/2018 | Dentzer et al. | |

FOREIGN PATENT DOCUMENTS

| | | |
|---|---|---|
| WO | 2017058042 | 4/2017 |
| WO | 2018170276 | 2/2019 |

OTHER PUBLICATIONS

Kornacker, M. et al. "Impala: A Modern, Open-Source SQL Engine for Hadoop", 7th Biennial Conference on Innovative Data Systems Research (CIDR'15) Jan. 4-7, 2015, Asilomar, California, USA.

(Continued)

*Primary Examiner* — Kris E Mackes
*Assistant Examiner* — Tiffany Thuy Bui

(57) ABSTRACT

A complex data type is encoded over columns of a table of a columnar database by mapping fields of the complex data type to the columns. An optimized query can be generated for a query specifying the complex data type. The optimized query specifies the columns to which the fields specified within the query are mapped, instead of specifying the fields. The optimized query can be processed against the database in a late materialization manner to fulfill the query.

20 Claims, 17 Drawing Sheets

(56) References Cited

OTHER PUBLICATIONS

Sun, L. et al. "Skipping-oriented Partitioning for Columnar Layouts", Proceedings of the VLDB Endowment, vol. 10, No. 4, 2016.
Shrinivas, L. et al., "Materialization strategies in the Vertica Analytic Database: Lessons Learned," 2013 IEEE 29th International Conference on Data Engineering (ICDE), pp. 1106-1207, Apr. 8-12, 2013.

* cited by examiner

```
request STRUCT (
        method   VARCHAR,
        uri      VARCHAR,
        version  VARCHAR)
```
~200

210

220

| request .method VARCHAR | request .uri VARCHAR | request .version VARCHAR |
|---|---|---|
|  |  |  |
|  |  |  |
| . . . | . . . | . . . |
|  |  |  |

222

```
request STRUCT (
         method    VARCHAR,
         uri       VARCHAR,
         version   VARCHAR,
         header    STRUCT (
                   encoding  VARCHAR,
                   from      VARCHAR
         )
)
```
300

310

320

| request<br>.method<br>VARCHAR | request<br>.uri<br>VARCHAR | request<br>.version<br>VARCHAR | request<br>.header<br>.encoding<br>VARCHAR | request<br>.header<br>.from<br>VARCHAR |
|---|---|---|---|---|
|  |  |  |  |  |
|  |  |  |  |  |
| . | . | . | . | . |
| . | . | . | . | . |
| . | . | . | . | . |
|  |  |  |  |  |

322

FIG 5A
```
tags  ARRAY  <  STRUCT (          ⌒500
           overall    VARCHAR,
           sub        VARCHAR)
>
```
FIG 5B
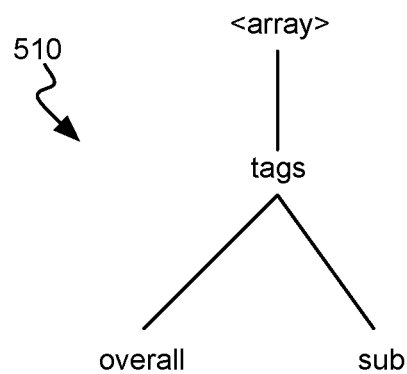
FIG 5C
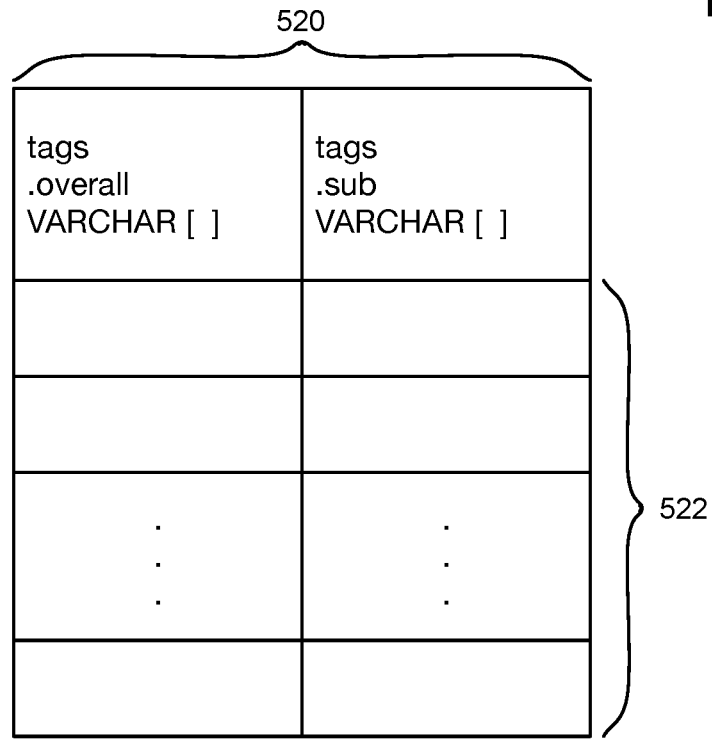

FIG 6A
```
request STRUCT (
    method    VARCHAR,
    accept    ARRAY< STRUCT (
                  encoding   VARCHAR,
                  locales    ARRAY<VARCHAR>
)
```
600
FIG 6B
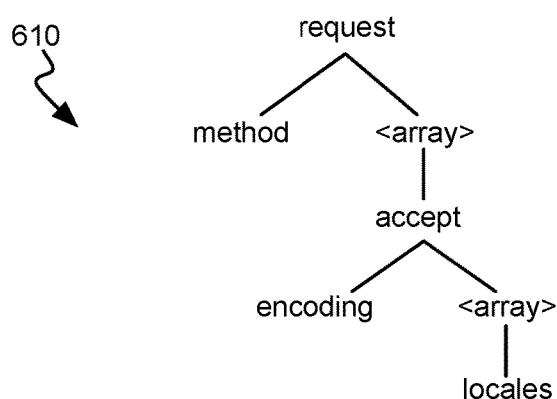
FIG 6C
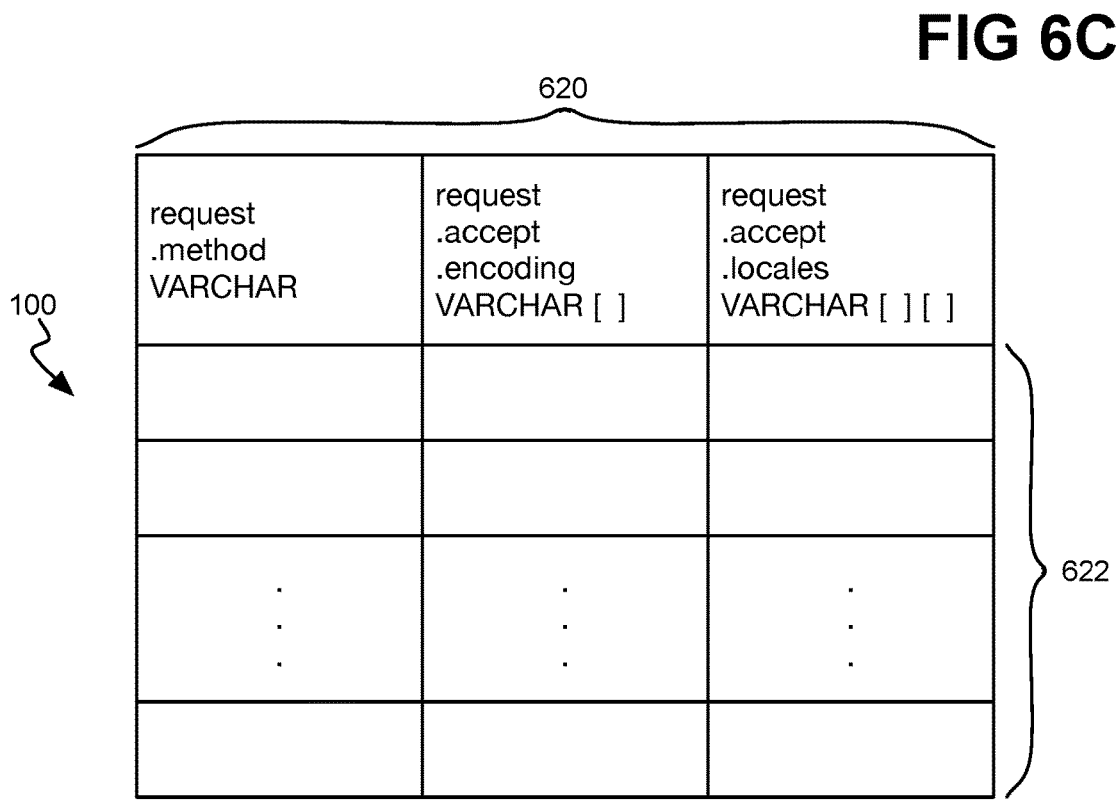

FIG 7A
700 — headers MAP<VARCHAR, VARCHAR>
FIG 7B
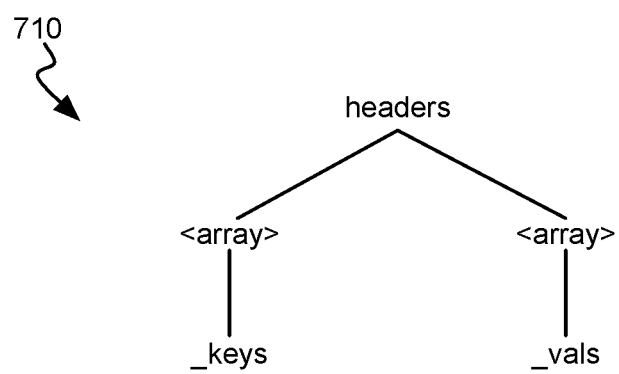
FIG 7C
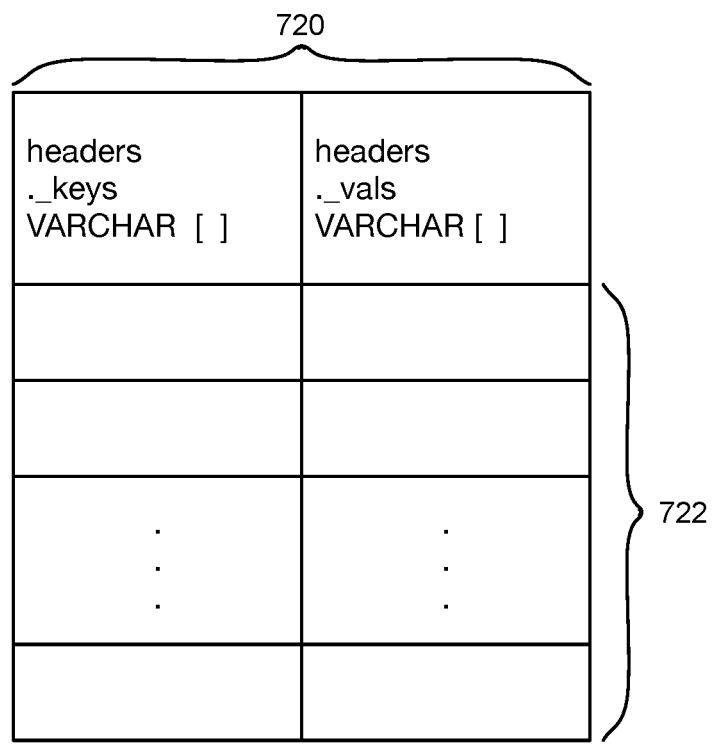

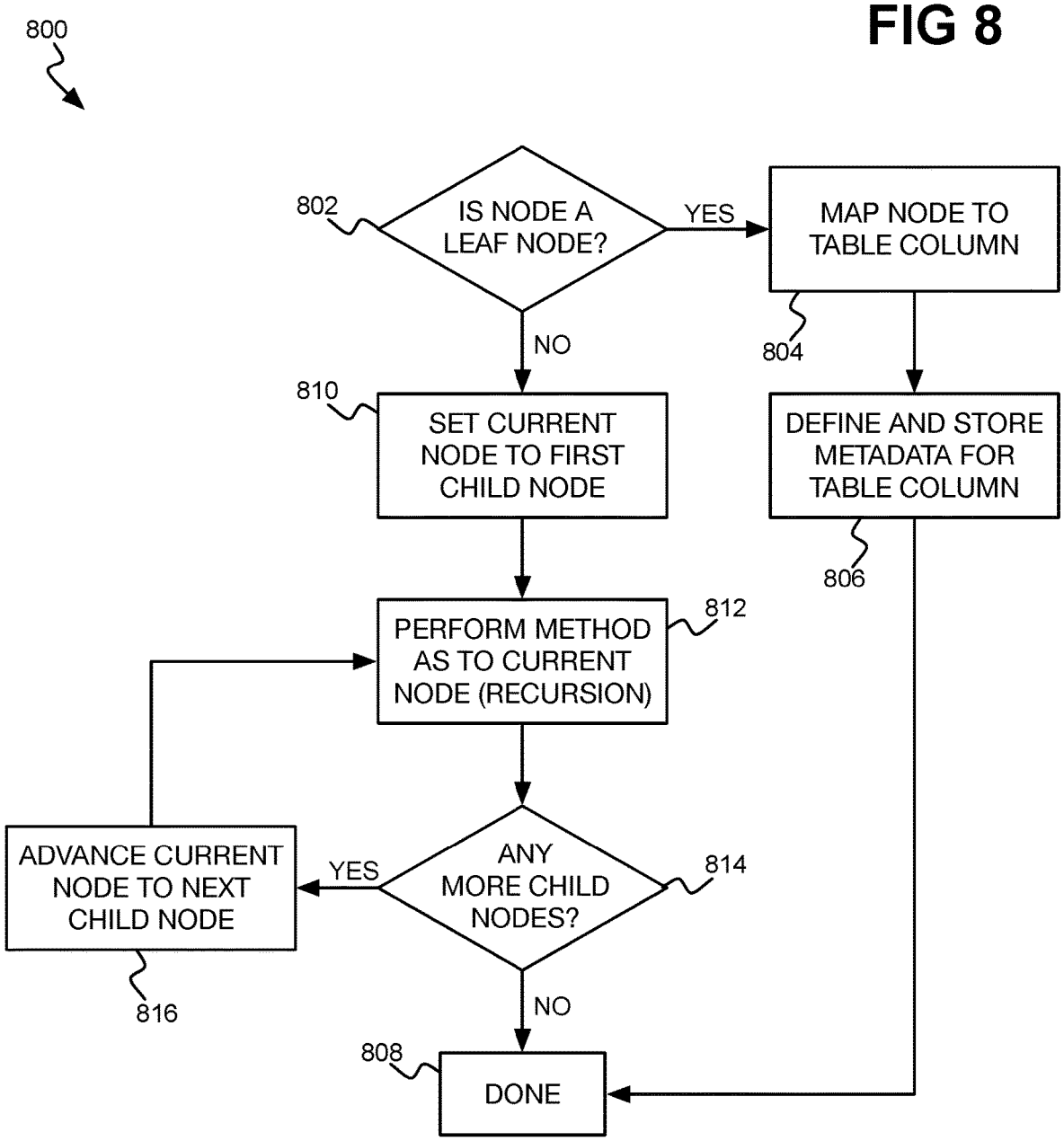

```
request STRUCT (
    method   VARCHAR,
    accept   ARRAY< STRUCT (
                       encoding  VARCHAR,
                       locales   ARRAY<VARCHAR>
                    )
              >,
    headers  MAP<VARCHAR, VARCHAR>
)
```
~900

FIG 11A

```
CREATE TABLE  http_requests (
     id  UUID,
     time  TIMESTAMP,
     request  STRUCT (
          method  VARCHAR,
          uri       VARCHAR,
          version  VARCHAR,
          header   STRUCT (
               encoding  VARCHAR,
               from         VARCHAR
          )
     )
);
```
~1100

FIG 16A

```
SELECT request FROM http_requests
    WHERE request.id = 'ABCD'
    AND request.time = '2019.08.25 15:49:00'
```
~1600

| request.id | request.time |
|---|---|
| 'ABCD' | '2019.08.20 12:22:00' | ←1616
| 'ABCD' | '2019.08.25 15:49:00' |
| 'ABCD' | '2019.08.25 15:49:00' |
| 'EFGH' | '2019.08.25 15:49:00' |
| 'EFGH' | '2019.08.25 15:49:00' |
| 'EFGH' | '2019.08.20 12:22:00' |

1612, 1614

US 11,327,995 B2

COMPLEX DATA TYPE ENCODING WITHIN COLUMNAR DATABASE

BACKGROUND

Data is the lifeblood of many entities like business and governmental organizations, as well as individual users. Large-scale storage of data in an organized manner is commonly achieved using databases. Databases are collections of information that are organized for easy access, management, and updating. Data may be stored in tables over rows (i.e., records or tuples) and columns (i.e., fields or attributes). In a relational database, the tables have logical connections, or relationships, with one another, via keys, which facilitates searching, organization, and reporting of the data stored within the tables.

BRIEF DESCRIPTION OF THE DRAWINGS

FIG. 5A is a diagram of another example array data type. FIG. 5B is a diagram of an example hierarchical tree graphically depicting this complex data type. FIG. 5C is a diagram of an example encoding of the array data type over columnar database table columns.

FIG. 6A is a diagram of another example structure data type. FIG. 6B is a diagram of an example hierarchical tree graphically depicting this complex data type. FIG. 6C is a diagram of an example encoding of the structure data type over columnar database table columns.

FIG. 7A is a diagram of an example map data type. FIG. 7B is a diagram of an example hierarchical tree graphically depicting this complex data type. FIG. 7C is a diagram of an example encoding of the map data type over columnar database table columns.

FIG. 8 is a flowchart of a method for recursively encoding a complex data type over columnar database table columns.

FIG. 11A is a diagram of example definition of a columnar database table storing data within table columns over which a complex data type has been encoded.

FIG. 16A is a diagram of an example optimized query. FIG. 16B is a diagram of example late-materialization processing of the optimized query.

DETAILED DESCRIPTION

As noted in the background, databases store data in tables over rows and columns, where the tables can be interrelated with one another in relational databases. In more traditional row-oriented databases, tables store data by rows. By comparison, in column-oriented databases, which are also referred to as columnar databases, tables store data by columns.

Databases can store data of different data types. The data types that are native to a particular database are referred to as primitive data types. For example, common primitive data types include binary data types, such as fixed-length and variable-length binary strings, as well as character or string data types, such as fixed-length and variable-length character strings. Other common primitive data types include Boolean data types, date and time data types, universally unique identifier (UUID) data types, and spatial (viz., geometric) data types. Still other common primitive data types include floating point and real numeric data types, as well as integer, decimal, and monetary numeric data types.

However, not all data may be easily represented using the primitive data types native to a database. Non-native data types are referred to as complex data types. Data sources as varied as web traffic data sources, warehouse management data sources, and Internet-of-Things (IoT) data sources often store sparse, multidimensional, and semi-structured data that is best represented using complex data types. Many existing columnar databases, however, do not support complex data types, rendering them less effective in processing data from such data sources.

Described herein are techniques for encoding complex data types within columnar databases. A complex data type is encoded over table columns of a columnar database by mapping the complex data type's fields to columns. The columns have primitive data types native to the database. The fields of a query specifying a complex data type can be decomposed into the table columns to which the fields have been mapped, and an optimized query generated that specifies columns instead of fields. The optimized query can be processed in a late-materialization manner, in which columns are not materialized until they are needed during query execution.

Figure 1:
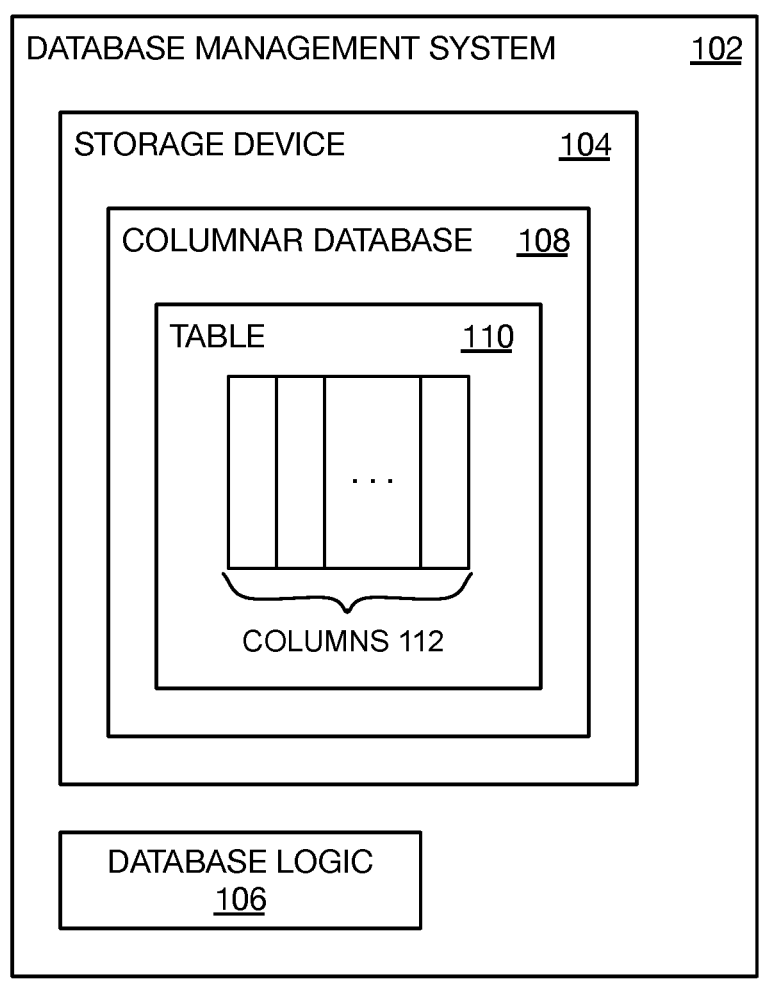
FIG. 1 is a diagram an example database management system including a columnar database.

FIG. 1 shows an example database management system 102. The database management system 102 includes a storage device 104 and database logic 106. The storage device 104 may be or include one or more storage devices of various types, including magnetic storage media and semiconductor storage media, and which may be organized in differing topological architectures, such as storage-array networks (SANs) and other storage architectures.

The storage device 104 stores a columnar database 108, such as the Vertica database management system available from Vertica Systems, of Cambridge, Mass., which is a subsidiary of Micro Focus International plc, of Newbury, U.K. The columnar database 108 stores data over one or more tables 110. Each table 110 includes one or more columns 112. As noted above, in a columnar database, data is stored by columns (i.e., by attributes), and not by rows (i.e., not by records).

The database logic 106 is implemented at least in hardware. For example, the database logic 106 can include a general-purpose processor that executes program code stored on a non-transitory computer-readable data storage medium of the logic 106. The database logic 106 may be or include an application-specific integrated circuit (ASIC), which is a type of special-purpose processor programmed in accordance with program code, such that the ASIC constitutes both the processor and the data storage medium.

The database logic 106 performs functionality associated with the database 108 as described in detail herein. For example, the logic 106 can encode a complex data type over the columns 112 by mapping the complex data type's fields to the columns 112. The database logic 106 can generate an optimized query for a received query specifying a complex data type, in which the query is rewritten to specify the columns 112 instead of fields of the complex data type. The logic 106 can process the optimized query against the database 108 in a late materialization manner as well.

Figures 2A, 2B, 2C:
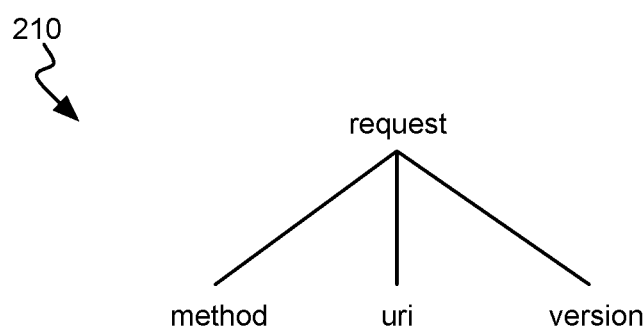
FIG. 2A is a diagram of an example structure data type.
FIG. 2B is a diagram of an example hierarchical tree graphically depicting this complex data type.
FIG. 2C is a diagram of an example encoding of the structure data type over columnar database table columns.

FIG. 2A shows an example complex data type 200, and FIG. 2B shows an example hierarchical tree 210 graphically representing the complex data type 200. The complex data type 200 is a structure data type ("STRUCT") named "request." The structure data type is a composition of other data types, such as primitive data types native to the columnar database 108 of FIG. 1 or other complex data types.

The complex data type 200 has three fields named "method," "uri," and "version." In the example, the three fields are primitive fields in that they each have a primitive data type. The primitive data type of each field is specifically a variable-length character string data type ("VARCHAR"). The complex data type 200 can be said to specify the primitive data types of its constituent primitive fields.

The nodes of the hierarchical tree 210 correspond to data types. The root node "request" corresponds to the structure data type of the "request" field. The leaf nodes "method," "uri," and "version" correspond to the "VARCHAR" primitive data types of their respective fields.

FIG. 2C shows example encoding of the complex data type 200 over columnar database table columns 220. Each field of the complex data type 200 is mapped to a corresponding table column 220. Each table column 220 has a primitive data type, native to the columnar database 108 of FIG. 1, and corresponding to the primitive data type of its respective field. For example, the field "uri" of the complex data type 200 is mapped to the middle column 220 "request.uri," which has the same primitive data type "VARCHAR" as the field "uri."

Data of the complex data type 200 can thus be organized within the columnar database 108 of FIG. 1 over the columns 220 and rows 222. Because the database 108 is a columnar database, the data is stored on a columnar basis and not on a row basis. For example, each column 220 stores the values for its corresponding attribute for all the rows 222, which may also be referred to as records. That is, the rows 222 themselves are not per se collectively stored as such within the database 108; rather, the columns 220 are.

During encoding of the complex data type 200 over the table columns 220, metadata is stored within the database table(s) of which the columns 220 are a part. The metadata defines the complex data type 200 and specifies the columns 220 to which the fields of the complex data type 200 have been mapped. For example, the metadata can specify that the complex data type 200 is of the structure data type with name "request," and has three fields of the primitive data type "VARCHAR" with names "method," "uri," and "version." The metadata can further specify that the three fields respectively map to the columns 220.

Figures 3A, 3B, 3C:
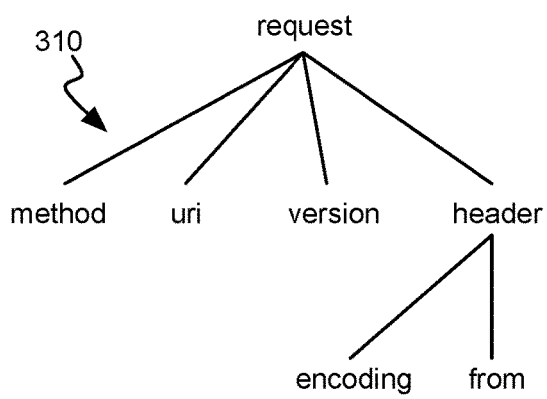
FIG. 3A is a diagram of another example structure data type.
FIG. 3B is a diagram of an example hierarchical tree graphically depicting this complex data type.
FIG. 3C is a diagram of an example encoding of the structure data type over columnar database table columns.

FIG. 3A shows an example complex data type 300, and FIG. 3B shows an example hierarchical tree 310 graphically representing the complex data type 300. The complex data type 300 is also a structure data type named "request," and also includes three fields named "method," "uri," and "version" of the primitive data type "VARCHAR." However, the complex data type 300 further has a fourth field, named "header," which itself has a complex data type.

The complex data type of the "header" field is another structure data type. FIGS. 3A and 3B thus show that complex data types can be nested within complex data types. In the example, the complex data type of the "header" field has two fields named "encoding" and "from," which are primitive fields each having the primitive data type "VARCHAR." The complex data type of the "header" field can be said to specify the primitive data types of its constituent primitive fields.

The nodes of the hierarchical tree 310 correspond to data types. The root node "request" corresponds to the structure data type of the "request" field. The leaf nodes "method," "uri," and "version" correspond to the "VARCHAR" primitive data types of their respective fields. The node "header" corresponds to the structure data type of the "header" field. The nodes "encoding" and "from" correspond to the "VARCHAR" primitive data types of their respective fields.

FIG. 3C shows example encoding of the complex data type 300 over columnar database table columns 320. The primitive fields of the complex data type 300 are each mapped to a corresponding table column 220 with a corresponding primitive data type of the primitive field. The "header" field, however, is not mapped to just one table column 320. Rather, because the "header" field has a complex data type, it is mapped to more than one column 320.

Specifically, each field of the "header" field is mapped to a corresponding table column 320. Each such column 320 has a primitive data type, native to the database 108 of FIG. 1, corresponding to the primitive data type of its respective field. For example, the field "encoding" of the complex data type of the "header" field is mapped to the column 320 named "request.header.encoding," which has the same primitive data type "VARCHAR" as the field "from" of the "header" field does.

Data of the complex data type 300 can thus be organized within the database 108 of FIG. 1 over the columns 320 and rows 322. As noted above, because the database 108 is a columnar database, the data is stored on a columnar basis and not a row basis. During encoding of the complex data type 300 over the columns 320, metadata is stored with the database table(s) of which the columns 320 are a part.

The metadata defines the complex data type 300 and specifies the columns 320 to which the fields have been mapped. For example, the metadata can specify a field named "header" and having the structure data type. The metadata specifies that the two fields of this structure data type are of the primitive data type "VARCHAR" and have names "encoding" and "from," and further specifies the columns 320 to which they are mapped.

Figure 4A:
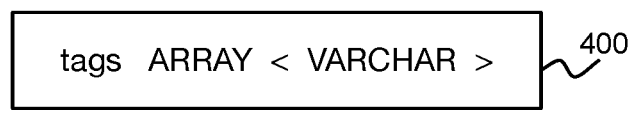
FIG. 4A is a diagram of an example array data type.

FIG. 4A shows another example complex data type 400. The complex data type 400 is an array data type ("ARRAY")

and has an array field named "tags." The array data type specifies an array of elements, which in the example of FIG. 4A are of a primitive data type, specifically the "VARCHAR" data type. Each record thus includes an array of elements, where each element is of the "VARCHAR" data type. For example, one record may be the array of elements "abc," "def," ghi," whereas another record may be the array of elements "123," "456." In other examples, the elements may be a different primitive data type, such as the integer or decimal data types.

Figure 4B:
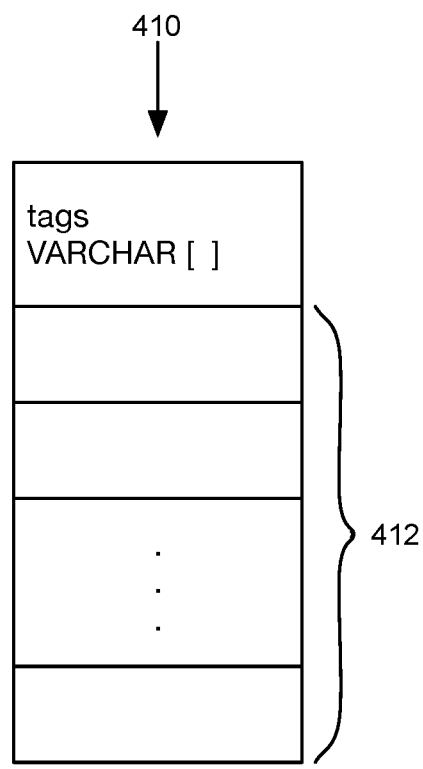
FIG. 4B is a diagram of an example encoding of this complex data type over a columnar database table column.

FIG. 4B shows an example encoding of the complex data type 400 over a columnar database table column 410. The array field is mapped to the corresponding table column 410. The table column 410 has a primitive data type, "VARCHAR," native to the database 108 of FIG. 1, and corresponding to the primitive data type of the array of elements. However, because the complex data type 400 is the array data type, the primitive data type of the column 410 is augmented with a pair of array index brackets "[ ]" to indicate that each record is an array of elements of this primitive data type. For instance, a given element n may be addressable as "tags[n]."

Data of the complex data type 400 is organized within the columnar database 108 of FIG. 1 over the column 410 and rows 412. During encoding of the complex data type 400, metadata is stored within the database table of which the column 410 is a part to define the complex data type 400 and specify the column 410 to which the array field has been mapped. When an individual record, or row 412, is updated, additional metadata may be stored at the record level, to indicate the number of array elements within the record.

The elements within a record may be demarcated according to a particular encoding scheme to specify how to identify individual elements within the record. For instance, the encoding scheme may identify a demarcation character or characters that separate adjacent elements within a record. The metadata stored with the database table itself may indicate this encoding scheme, or the encoding scheme may be specified in each record. In one implementation, the encoding scheme may specify that the array of each record is encoded as a "VARCHAR" data type even if the individual elements are of a different primitive data type, such as the integer or decimal data type. This is because the "VARCHAR" data type may be the primitive data type that provides for variable length data, which is needed for array storage.

FIG. 5A shows an example complex data type 500, and FIG. 5B shows an example hierarchical tree 510 graphically representing the complex data type 500. The complex data type 500 is also an array data type named "tags" and specifies an array of elements. However, the elements are of a complex data type, not a primitive data type.

The complex data type of the array of elements is the structure data type in the example. FIGS. 5A and 5B thus show that the elements of an array can have of a complex data type as opposed to a primitive data type. The structure data type specifies two primitive fields in the example, named "overall" and "sub," which each have the primitive data type "VARCHAR."

The nodes of the hierarchical tree 510 correspond to data types. The root node "<array>" corresponds to the array data type of the "tags" field, and the node "tags" corresponds to the structure data type of the "tags" field. The leaf nodes "overall" and "sub" correspond to the "VARCHAR" primitive data types of their respective fields.

FIG. 5C shows example encoding of the complex data type 500 over columnar database table columns 520. The primitive fields of the structure data type of the array of elements are each mapped to a corresponding table column 520. Each table column 520 has a corresponding primitive data type, "VARCHAR," native to the database 108 of FIG. 1. Because the complex data type 500 is the array data type, the primitive data type of each column 520 is augmented with "0" to indicate that each record is an array of elements of this primitive data type.

Data of the complex data type 500 is organized within the columnar database 108 of FIG. 1 over the column 520 and rows 522. During encoding of the complex data type 500, metadata is stored with the database table(s) of which the columns 520 are a part to define the complex data type 500 and specify the columns 520 to which the primitive fields of the array of elements correspond. When individual records, or rows 522, are updated, additional metadata may be stored at the record level, to indicate the number of array elements within the record, as noted above.

FIG. 6A shows another example complex data type 600, and FIG. 6B shows an example hierarchical tree 610 graphically representing the complex data type 600. The complex data type 600 is a structure data type named "request," and includes two fields named "method" and "accept." The "method" field is a primitive field having the primitive data type "VARCHAR." The "accept" field, however, is an array field specifying an array of elements of a complex data type, specifically a structure data type.

The structure data type of the elements of the "accept" array has two fields named "encoding" and "locales." The "encoding" field is a primitive field having the primitive data type "VARCHAR." The "locales" field, however, is another array field, and specifies an array of elements of the primitive data type "VARCHAR."

FIGS. 6A and 6B thus show that complex data types can have multiple levels of nesting. In the example, the "locales" array is nested within the structure data type of the elements of the array "accept." In turn, the array "accept" is nested within the structure data type "request."

The nodes of the hierarchical tree 610 correspond to data types. The root node "request" corresponds to the structure data type of the "request" field. The leaf node "method" corresponds to the "VARCHAR" primitive data type of the "method" field. The nodes "<array>" and "accept" under the node "request" respectively correspond to the array data type and the structure data type of the "accept" field. The leaf node "encoding" corresponds to the "VARCHAR" data type of the "encoding" field. The nodes "<array>" and "locales" under the node "accept" respectively corresponding to the array data type and the "VARCHAR" data type of the "locales" field.

FIG. 6C shows example encoding of the complex data type 600 over columnar database table columns 620, with data of the complex data type 600 resultantly organized over the columns 620 and rows 622. During encoding of the complex data type 600, metadata is stored within the database table(s) of which the columns 620 are a part to define the complex data type 600 and specify the columns 620. The primitive field "method" is mapped to a corresponding table column 620 having the primitive data type "VARCHAR." The primitive field "encoding" of the structure data type specified by the array "accept" is mapped to a corresponding column 620 having the primitive data type "VARCHAR," and is augmented with "[ ]" to indicate that each record is an array of elements having this primitive data type.

For instance, for an array of elements, the value for the primitive field "encoding" of a given element n may be addressable as "request.accept.encoding[n]." As an example, a record of the complex data type 600 may store two array elements in the "accept" array. The first array element may have the value "UTF-8" for the "encoding" field, and the second array element may have the value "ISO" for this field. Therefore, "request.accept.encoding[1]" may identify the value "UTF-8" and "request.accept.encoding[2]" may identify the value "ISO."

The array field "locales" is mapped to a corresponding column 620 having the primitive data type "VARCHAR," which is the primitive data type specified by this array. The data type is augmented with "[ ][ ]," to indicate that each record is an array of arrays of elements of this primitive data type. That is, for each element of the array "accept," there is an array of elements "locales." The first "[ ]" corresponds to the array "accept," and the second "[ ]" corresponds to the array "locales."

As an example, a record of the complex data type 600 may have an array of two elements as the "accept" array. The first "accept" array element may have an array of elements "en-US," "en-ES" as its "locales" array. The second "accept" array element may have an array of elements "fr-FR," "en-GB," "po-BR" as its "locales" array. Therefore, "request.accept.locales[1]" identifies "en-US," "en-ES," whereas "request.accept.locales[2]" identifies "fr-FR," "en-GB," "po-BR." To identify a particular element within the "locales" array, a second "[ ]" is used. For example, "request.accept.locales[1][2]" identifies "en-ES," whereas ""request.accept.locales[2][1]" identifies "fr-FR."

As noted above, array elements within a record may be demarcated according to a particular encoding scheme to specify how to distinguish the individual elements. In the case of an array of arrays of elements, the encoding scheme specifies how to distinguish the individual elements of each latter array, as well as the individual arrays of the former array. An example of such an encoding scheme is the format used by the Dremel data analysis software.

For instance, in the ongoing example, a record of the complex data type 600 may have an array of two elements as the "accept" array. The first "accept" array element may have the value "UTF-8" for the "encoding" field and the array of elements "en-US," "en-ES" for "locales" field. The second "accept" array element may have the value "ISO" for the "encoding" field and the array of elements "fr-FR," "en-GB," "po-BR" for the "locales" field.

The "request.accept.encoding" column 620 thus stores "UTF-8," "ISO" for this record, whereas the "request.accept.locales" column 620 stores "en-US," "en-ES," "fr-FR," "en-GB," "po-BR" for this record. The encoding scheme specifies how to identify that "UTF-8" belongs to the first "accept" array element and "ISO" belongs to the second "accept" array element. The encoding scheme specifies how to identify that "en-US," "en-ES" belong to the first "accept" array element and "fr-FR," "en-GB," "po-BR" belong to the second "accept" array element. The encoding scheme specifies how to identify that "en-US" and "en-ES" are different elements of the "locales" array of the first "accept" array element," and that "fr-FR," "en-GB," "po-BR" are different elements of the "locales" array of the second "accept" array element.

FIG. 7A shows another complex data type 700, and FIG. 7B shows an example hierarchical tree 710 graphically representing the complex data type 700. The complex data type 700 is a map data type named "headers." The map data type specifies two primitive data type arrays, an array of key elements and an array of value elements.

The map data type intrinsically includes two fields, without explicitly naming them, a key array field of the first specified primitive data type, and a value array field of the second specified second primitive data type. In the example, the primitive data type of each array is the "VARCHAR" data type. The map data type can be considered a special case of a structure data type specifying two arrays of elements of primitive data types.

The nodes of the hierarchical tree 710 correspond to data types. The root node "headers" corresponds to the map data type of the "headers" field. The array nodes "<array>" correspond to implicit array data types of the map data type. The node "_keys" corresponds to the first "VARCHAR" data type of the "headers" field, and the node "_vals" corresponds to the second "VARCHAR" data type of the "headers" field.

FIG. 7C shows example encoding the complex data type 700 over columnar database table columns 720, with data of the complex data type 700 resultantly organized over the columns 720 and rows 722. During encoding of the complex data type 700, metadata is stored within the database table(s) of which the columns 720 are a part to define the complex data type 700 and specify the columns 720. The key and value array fields are mapped to corresponding table columns 720 having the primitive data type "VARCHAR."

Specifically, the key array field is mapped to a table column 720 named "headers._keys" and the value array field is mapped to a table column 720 named "headers_vals." The underscore ("_") character may identify that the names "keys" and "vals" are intrinsic to the map data type and not explicitly called out in the complex data type 700. The primitive data type "VARCHAR" of each column 720 is augmented with "[ ]" to indicate that each record is an array of elements having this primitive data type.

As has been described, array elements within a record may be demarcated according to a particular encoding scheme to specify how to distinguish the individual elements. The metadata stored with the database table itself may indicate this encoding scheme, or the encoding scheme may be specified in each record. The encoding scheme thus identifies how to distinguish among individual key elements in the key array and how to distinguish among individual value elements in the value array.

FIG. 8 shows an example method 800 for recursively encoding a complex data type over table columns of a columnar database. The method 800 can be performed by a database management system. For example, the method 800 may be implemented as program code stored on a non-transitory computer-readable data storage medium, and executed by a processor of a computing device of the system.

As a general overview, to encode a complex data type, the method 800 is called by passing the root node of the hierarchical tree representing the complex data type in an initial iteration. Additional iterations of the method 800 are recursively called as nodes of the tree are traversed, until the bottom-most nodes have been reached. The bottom-most nodes are leaf nodes, which are nodes that do not have any child nodes and that correspond to primitive data types that are native to the database.

Specifically, then, for a current iteration of the method 800, if the passed node is a leaf node (802), it is mapped to a table column (804), and metadata for the table column is defined and stored (806). The current recursive iteration is thus finished (808), with control returning to the iteration that called the current iteration. However, if the node is not a leaf node (802), then a current node for the current iteration is set to the first child node of this node (810). A current node is maintained for every iteration of the method 800.

Another recursive iteration of the method 800 is started as to the current node (812). That is, a new iteration of the method 800 is started by passing the current node to the method 800 in another call of the method 800. The current iteration waits until control is returned, which is when the new iteration has finished.

Once control is returned to the current iteration of the method 800, if the node has other child nodes that have not yet been traversed (814), the current node of the current iteration is advanced to the next child node (816), and the method 800 proceeds back to part 812. Otherwise, the current recursive iteration of the method 800 is finished (808), with control returning to the iteration that called the current iteration, or with encoding of the complex data type having finished if the current iteration is the initial iteration of the method 800.

Figures 9A, 9B:
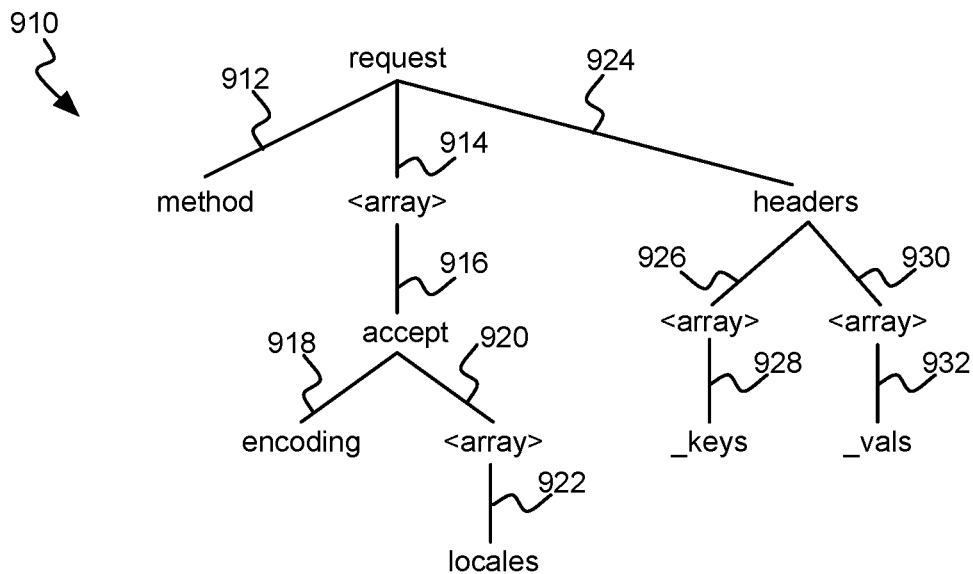
FIG. 9A is a diagram of an example complex data type.
FIG. 9B is a diagram of an example hierarchical tree graphically depicting this complex data type.

FIG. 9A shows an example complex data structure 900 in relation to which example performance of the method 800 is now described. FIG. 9B shows an example hierarchical tree 910 graphically representing the complex data structure 900. An initial recursive iteration of the method 800 is started with respect to the request node, which is the root or top-most node of the tree 910.

The request node has three children nodes: a method node, an array node, and headers node. The current node of the initial iteration is set to the method node, and a new recursive iteration of the method 800, corresponding to branch 912, is started. Because the method node is a leaf node, a table column having the primitive data type of the leaf node is mapped to the leaf node, with corresponding metadata defined. The iteration of the method 800 corresponding to the branch 912 ends, with control returning to the initial iteration.

The current node of the initial iteration is then advanced from the method node to the <array> node under the request node, and a new recursive iteration of the method 800, corresponding to branch 914, is started. The <array> node is not a leaf node. The current node for the iteration corresponding to the branch 914 is set to the sole leaf node of this <array> node, which is the accept node, and another recursive iteration of the method 800, corresponding to branch 916, is started.

The accept node is not a leaf node. The current node for the iteration corresponding to branch 916 is set to the first leaf node of the accept node, which is the encoding node, and another recursive iteration of the method 800, corresponding to branch 918, is started. Because the encoding node is a leaf node, a table column is mapped to the primitive data type to which this leaf node corresponds, with corresponding metadata defined. The iteration of the method 800 corresponding to the branch 918 ends, with control returning to the iteration corresponding to the branch 916.

The current node for the iteration corresponding to the branch 916 is advanced to the other child node of the accept node, which is an <array> node, and another recursive iteration of the method 800, corresponding to branch 920 is started. This <array> node is not a leaf node. Therefore, the current node for the iteration corresponding to branch 920 is set to the sole child node of this <array> node, which is the locales node, and another recursive iteration of the method 800, corresponding to branch 922, is started.

The locales node is a leaf node. Therefore, a table column is mapped to the primitive data type to which this leaf node corresponds, with corresponding metadata defined. The iteration corresponding to the branch 922 ends, returning control to the iteration corresponding to the branch 920. Because the locales node 922 is the sole child node of the <array> node under the accept node, control returns to the iteration corresponding to the branch 916. Because all child nodes of the accept node have now been traversed, control returns to the iteration corresponding to the branch 914. Because the accept node is the sole child node of the <array> node under the request node, control returns to the initial iteration of the method 800.

The current node for the initial iteration is advanced to the last child node of the request node, which is the headers node. A new recursive iteration of the method 800, corresponding to branch 924, is started. The headers node is not a leaf node. Therefore, the current node for the iteration corresponding to branch 924 is set to the first child node of the headers node, which is a first <array> node under the headers node, and another recursive iteration of the method 800, corresponding to branch 926, is started.

The <array> node is also not a leaf node. The current node for the iteration corresponding to branch 926 is therefore set to the sole child node of this <array> node, which is the _keys node, and another recursive iteration of the method 800, corresponding to branch 928, is started. The _keys node is a leaf node. A table column is therefore mapped to the primitive data type to which this leaf node corresponds, with corresponding metadata defined.

The iteration corresponding to the branch 928 ends, returning control to the iteration corresponding to the branch 926. Because the first <array> node under the headers node has no other child nodes, control returns to the iteration corresponding to the iteration corresponding to the branch 924. The current node for the iteration corresponding to the branch 924 is advanced to the other child node of the headers node, which is a second <array> node under the headers node. Another recursive iteration of the method 800, corresponding to branch 930, is started.

This <array> node is also not a leaf node. The current node for the iteration corresponding to the branch 930 is therefore set to the sole child node of this <array> node, which is the _vals node, and another recursive iteration of the method 800, corresponding to branch 932, is started. The _vals node is a leaf node. A table column is therefore mapped to the primitive data type to which this leaf node corresponds, with corresponding metadata defined.

The iteration corresponding to the branch 932 ends, returning control to the iteration corresponding to the branch 930. Because the second <array> node under the headers node has no other child nodes, control returns to the iteration corresponding to the branch 924. Because all child nodes of the headers node have now been visited, control returns to the initial iteration of the method 800. Because all child nodes of the request node have now been visited, the initial iteration of the method 800 is finished, completing encoding of the complex data type 900.

Figure 10:
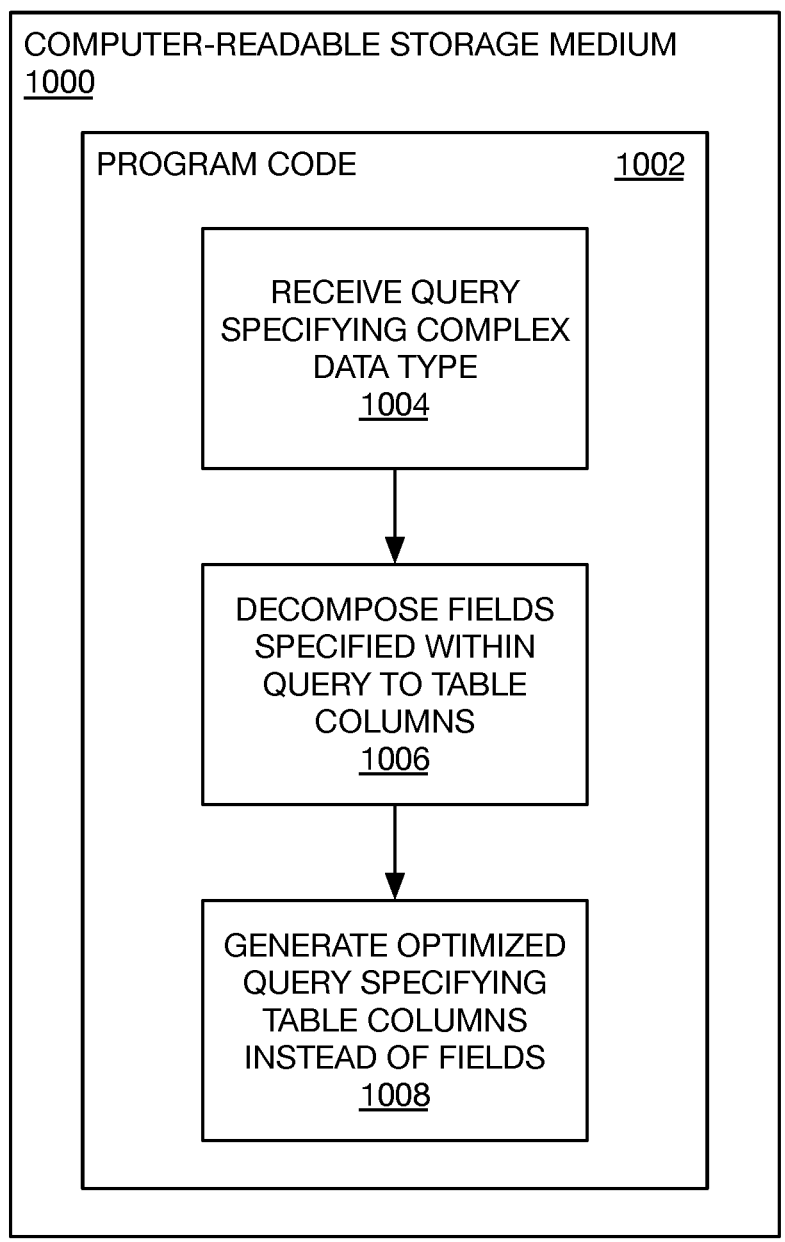
FIG. 10 is a diagram of an example non-transitory computer-readable data storage medium storing program code for optimizing a query.

FIG. 10 shows an example non-transitory computer-readable data storage medium 1000 storing program code 1002 for optimizing a query. For example, a processor of a computing device of a database management system can execute the program code 1002. The query specifies a complex data type of data stored in a table of a columnar database in which the complex data type has been encoded as described above. The query is optimized, or rewritten, so that it can be subsequently executed to fulfill the query against the columnar database.

The query is received (1004). The query can specify fields of the complex data type. The query-specified fields are decomposed to the columns over which they have been mapped (1006). For instance, for each field specified within the query, the metadata for the complex data type can be inspected to identify the columns over which the field has been mapped, resulting in decomposition of the field into these columns.

An optimized query is then generated (1006). The optimized query specifies table columns instead of complex data type fields as in the originally received query. The optimized query is generated using the identified columns to which the query fields have been decomposed. Example query optimization is now described in relation to a database table storing data within columns over which a complex data type has been encoded.

FIG. 11A shows an example of such a columnar database table definition 1100. The database table definition 1100 specifies a database table named "http_requests" having two primitive fields "id" and "time" that respectively have "UUID" and "TIMESTAMP" primitive data types. The "http_requests" table also has a field "request" having a complex data type, specifically the structure data type of FIG. 3A that has been described.

Figure 11B:
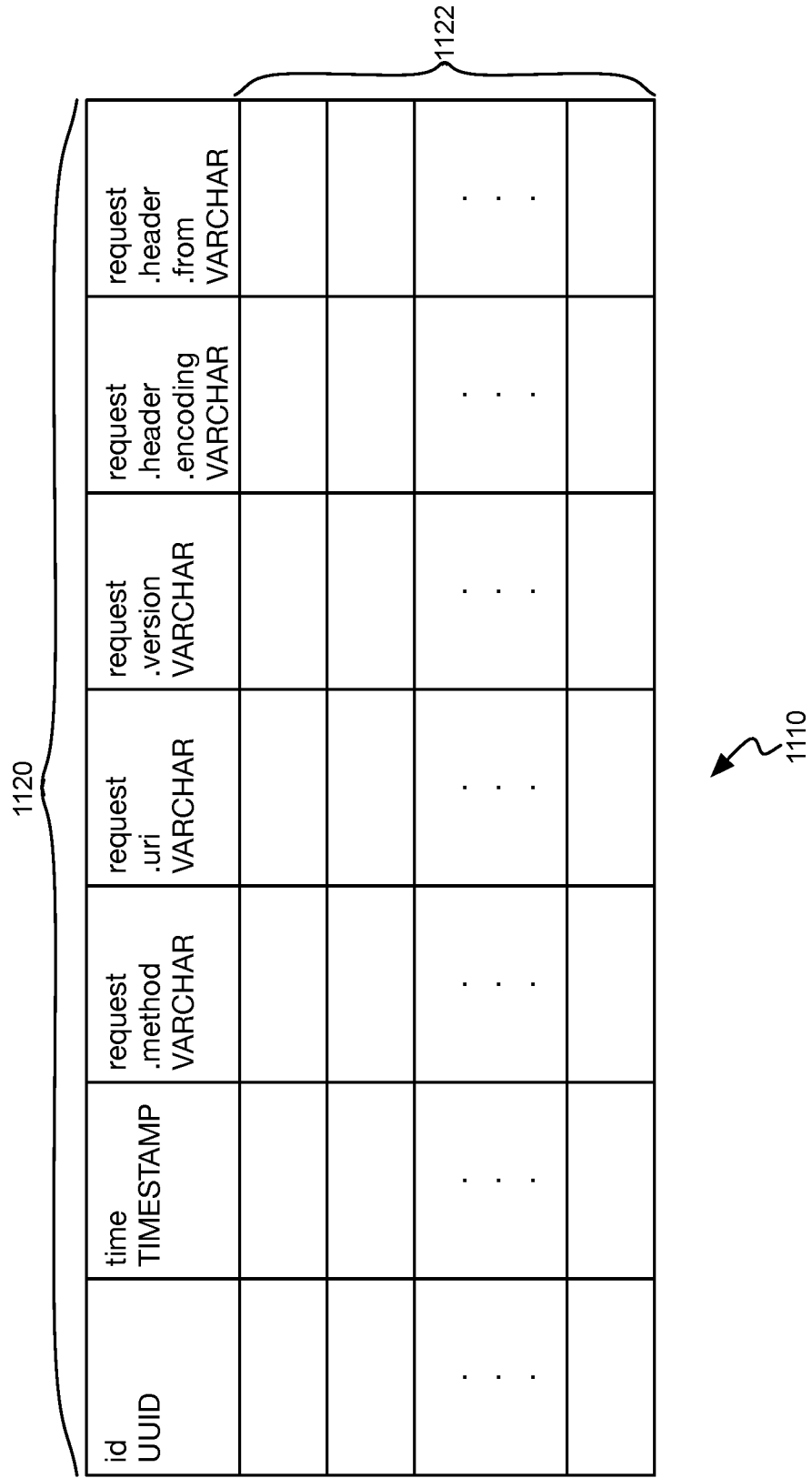
FIG. 11B is a diagram of an example columnar database table according to this definition.

FIG. 11B shows an example columnar database table 1110 according to the definition 1100. The database table 1110 stores data organized over columns 1120 and 1122. Because the table 1110 is a columnar database table, the data is stored on a columnar basis and not on a row basis, as has been described. The two left-most columns 1120 correspond to the primitive data types of the primitive fields "id" and time." The other columns 1120 are the columns over which the structure data type of the field "request" has been encoded, as in FIG. 3C above.

Figure 12A:
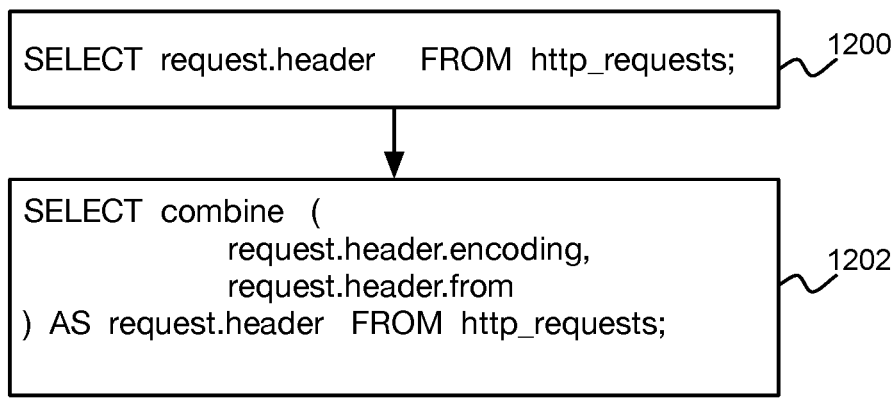
FIGS. 12A and 12B are diagrams of example query optimization in which optimized queries specifying combinations of columns are generated from queries specifying fields having complex data types.
Figure 12B:
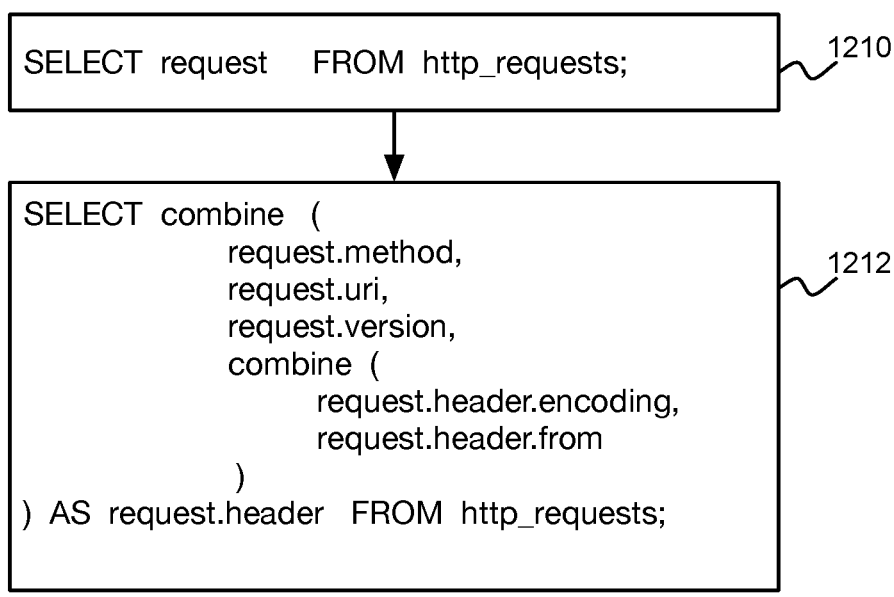

FIGS. 12A and 12B show example query optimization in which optimized queries that specify combinations of columns are generated from queries that specify fields having complex data types. In FIG. 12A, a query 1200 is requesting the "header" field of the "request" field of each record from the database table "http_requests." The "header" field has a structure data type.

The "header" field is decomposed into the table columns "request.header.encoding" and "request.header.from" to which the primitive fields "encoding" and "from" of the "header" field have been mapped. The query 1200 can then be rewritten as an optimized query 1202 that requests a combination of the columns "request.header.encoding" and "request.header.from." The optimized query 1202 is executable against data stored in the database table 1110 to fulfill the query 1200.

In FIG. 12B, a query 1210 is requesting the "request" field of each record from the table "http_requests." The "request" field has a structure data type, and besides primitive fields "method," "uri," and "version" of primitive data types, specifies the "header" field that also has a structured data type, and which itself has primitive fields "encoding" and "from." The "request" field is decomposed into five table columns: the columns "request.method," request.uri," and "request.version" to which the primitive fields "method," "uri," and "version" have been mapped, and the columns "request.header.encoding" and "request.header.from" to which the primitive fields "encoding" and "from" of the "header" field have been mapped.

The query 1210 can be rewritten as an optimized query 1212 that requests a combination of the columns "request.method," request.uri," and "request.version" and a sub-combination of the columns "request.header.encoding" and "request.header.from." The sub-combination is nested within the combination to reflect the complex data type of the "request" field, which has a nested complex data type of the "header" field is nested. The columns are combined in the optimized query 1212, in other words, in accordance with how their corresponding primitive data types are specified within the complex data type of the "request" field.

Figure 13:
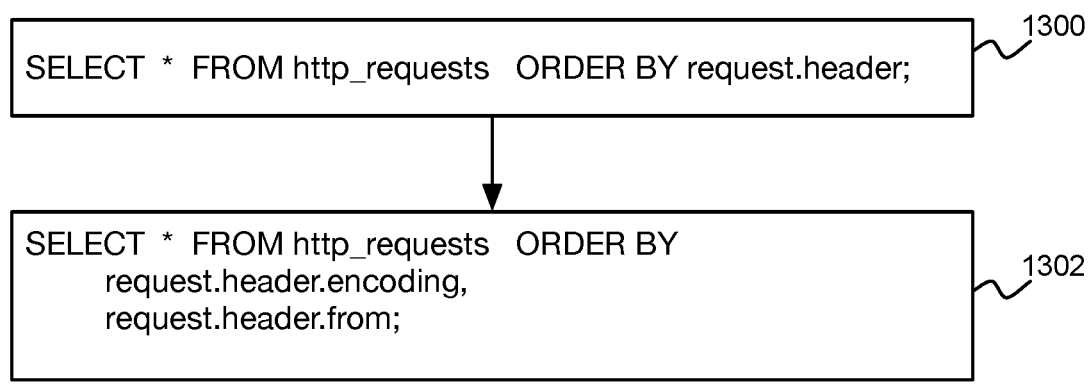
FIG. 13 shows a diagram of an example query optimization in which columns are ordered within an optimized query according to the order in which a complex data type specifies fields to which the columns are mapped.

FIG. 13 shows example query optimization in which columns are ordered within an optimized query according to the order in which the complex data type specifies the fields to which the columns are mapped. A query 1300 is requesting the records from the database table "http_requests" as ordered by the "header" field of the "request" field. The "header" field has a structure data type. The "header" field is decomposed into the table columns "request.header.encoding" and "request.header.from" to which the primitive fields "encoding" and "from" of the "header" field have been mapped.

The query 1300 can then be rewritten as an optimized query 1302, in which the columns "request.header.encoding" and "request.header.from" are ordered in the same order in which the "encoding" and "from" fields are encoded within the structure data type of the "header" field. Ordering occurs first by the column "request.header.encoding" and then by the column "request.header.from." This is because the "encoding" field precedes the "from" field within the structure data type of the "header" field.

Figure 14:
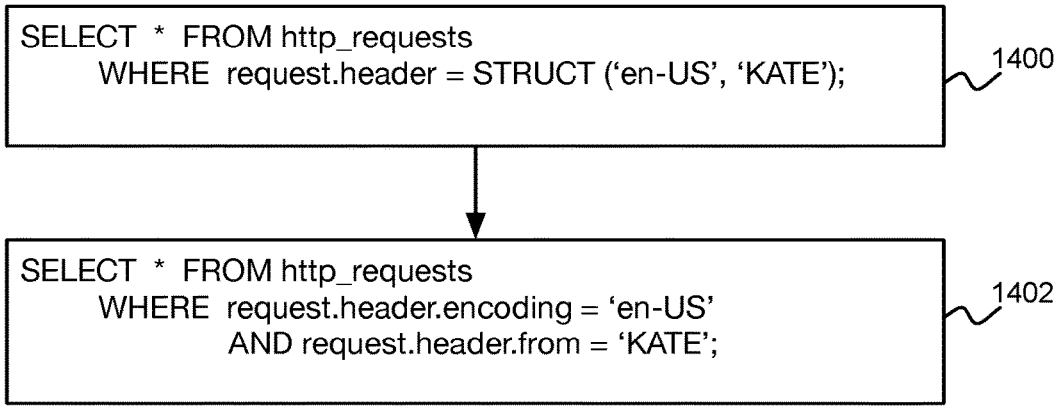
FIG. 14 is a diagram of an example query optimization in which comparisons of columns within optimized queries are linked by logical operators in accordance with comparisons of corresponding fields within queries.

FIG. 14 shows example query optimization in which compared of columns within optimized queries are linked by logical operators in accordance with comparisons of their corresponding fields within queries. A query 1400 is requesting the records from the database table "http_requests" in which the structure data type of the "header" field of the "request" field has the value "('en-US', 'KATE')." The "header" field is again decomposed into the table columns "request.header.encoding" and "request.header.from" to which the primitive fields "encoding" and "from" of the "header" field have been mapped.

The query 1400 can then be rewritten as an optimized query 1402, in which the conditional comparison of the column "request.header.encoding" is linked to the conditional comparison of the column "request.header.from" according to the comparisons of the "encoding" and "from" fields within the query 1400. That the structure data type of the "header" field has the value "('en-US', 'KATE')" in the query 1400 means that the value for the primitive data type of the field "encoding" is equal to "en-US" and that the value for the primitive data type of the field "from" is equal to "KATE." Therefore, the conditional comparisons of the columns "request.header.encoding" and "request.header.from" are correspondingly linked in the optimized query 1402 by the logical operator AND.

Figure 15:
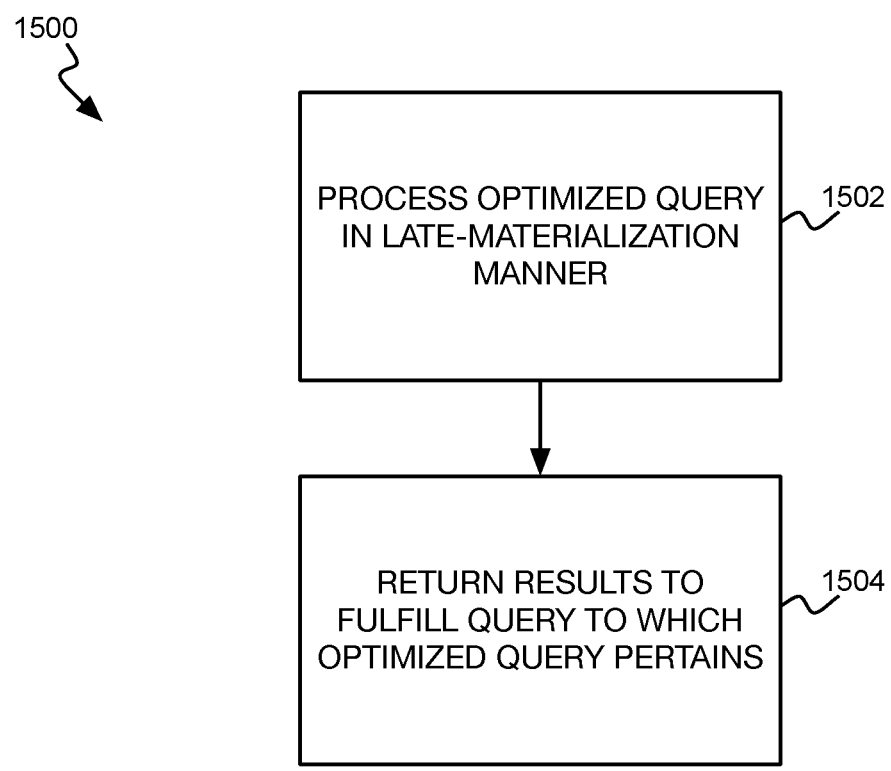
FIG. 15 is a flowchart of an example method for query execution of an optimized query.

FIG. 15 shows a method 1500 for example query execution of an optimized query. A database management system can perform the method 1500. The optimized query corresponds to a query that specifies fields of a complex data type. The optimized query specifies the table columns over which the fields have been mapped, instead of the fields, as noted above.

The optimized query is processed in a late-materialization manner (1502). This means that materialization of each column is delayed until it is actually needed during processing. Materialization refers to how columns are reconstructed to fulfill a query. Late materialization can also be referred to as lazy materialization, and improves performance by not retrieving data that is unnecessary to process the query. The results obtained from processing the optimized query are returned to fulfill the query to which the optimized query corresponds (1504).

FIG. 16A shows an example optimized query 1600. FIG. 16B shows example late-materialization processing of the query 1600 against columnar database table columns 1610.

The table columns 1610 include "request.id" and "request.time" columns that respectively correspond to the primitive fields "id" and "time" of the structure data type of the "request" field. The optimized query 1600 is requesting the records from the database table "http_requests" for which the "request.id" column is "ABCD" and the "request.time" column is "2019.08.25 15:49:00."

Processing of the optimized query 1600 may first materialize the "request.id" column, because the comparison "request.id='ABCD'" appears first in the query 1600. Just the values that the "request.id" column stores for records 1612 are reconstructed, because the "request.id" column stores "ABCD" just for these records. No other records of the "request.id" column are reconstructed, and no record of the "request.time" column is reconstructed. At this stage in the query processing, the "request.time" column is not materialized because it is not needed to process the comparison "request.id='ABCD.'"

Processing of the optimized query 1600 then materializes the "request.time" column, because the comparison "request.time='2019.08.25 15:49:00'" appears next in the query 1600. Late-materialization processing of the "request.time" column does not have to consider records other than the records 1612 that were reconstructed during prior materialization of the "request.id" column, since no other records will satisfy the optimized query 1610. Furthermore, just the values that the "request.time" column stores for records 1614 are reconstructed, because the column stores "2019.08.25 15:49:00" just for these records.

Therefore, processing the optimized query 1600 in a late-materialization manner unnecessarily materializes just the value that the "request.time" column stores for the record 1616. Performance improves as compared to early-materialization query processing. For example, such early-materialization query processing might reconstruct the values that each column 1610 stores for all records, even though such reconstruction is unnecessary to fulfill the query 1600.

Techniques have been described herein for encoding complex data types within columnar databases. Columnar databases can therefore be used for analysis of a wider variety of data stores, such as those that store sparse, multidimensional, and semi-structured data. In the techniques that have been described, a complex data type is encoded over table columns of a columnar database by mapping the complex data type's fields to columns having primitive data types native to the database. Such an approach leverages a columnar database's existing primitive data type processing capability of the database for processing complex data types as well.

We claim:

1. A database management system comprising:
a hardware storage device storing a columnar database;
and a database logic including a processor that executes program code stored on a non-transitory computer-readable data storage medium to:
encode each of a plurality of complex data types, including first and second complex data types, over columns of a table of the database by mapping fields of the complex data types to the columns, each column having a primitive data type native to the database,
wherein the first complex data type comprises a first structure data type specifying a first array of elements having a second structure data type specifying a second array of elements having the primitive data type, the fields comprising a first array field corresponding to the second array of elements, and wherein the primitive data type of the column to which the first array field is mapped is the primitive data type of the second array of elements,
wherein the second complex data type comprises an array data type specifying a third array of elements having the primitive data type, the fields comprising a second array field corresponding to the third array of elements, and wherein the primitive data type of the column to which the second array field is mapped is the primitive data type of the third array of elements.

2. The database management system of claim 1, wherein the array data type is a first array data type, the plurality of complex data types further include a third complex data type comprising a second array data type specifying a fourth array of elements having a third structure data type specifying a plurality of second primitive data types, the fields comprising a plurality of primitive fields of the second primitive data types, and wherein, for each primitive field, the primitive data type of the column to which the primitive field is mapped is the second primitive data type of the primitive field.

3. The database management system of claim 1, wherein the primitive data type is a first primitive data type, the first structure data type further specifies a plurality of second primitive data types, the fields comprising a plurality of primitive fields of the second primitive data types,
and wherein, for each primitive field, the primitive data type of the column to which the primitive field is mapped is the second primitive data type of the primitive field.

4. The database management system of claim 3, wherein the primitive fields are first primitive fields,
wherein the first structure data type further specifies a second structure data type specifying a plurality of third primitive data types, the fields comprising a plurality of second primitive fields of the third primitive data types,
and wherein, for each second primitive field, the primitive data type of the column to which the second primitive field is mapped is the third primitive data type of the second primitive field.

5. The database management system of claim 1, wherein the primitive data type is a first primitive data type, the plurality of complex data types further include a third complex data type comprising a map data type specifying an array of key elements having a second primitive data type and an array of value elements having a third primitive data type, the fields comprising a key array field corresponding to the array of key elements and a value array field corresponding to the array of value elements,
and wherein the primitive data type of the column to which the key array field is mapped is the second primitive data type of the array of key elements, and the primitive data type of the column to which the value array field is mapped is the third primitive data type of the array of value elements.

6. The database management system of claim 5, wherein the processor is to encode the map data type in part by identifying how to distinguish individual key elements within the array of key elements and how to distinguish individual value elements within the array of value elements.

7. The database management system of claim 1, wherein the primitive data type of each column comprises a string data type or an integer data type.

8. The database management system of claim 1, wherein each complex data type specifies a tree of fields including leaf fields having primitive data types, and wherein the processor is to encode each complex data type by recursively traversing the tree until the leaf fields have been individually mapped to the columns.

9. The database management system of claim 1, wherein the processor is to encode each complex data type by storing metadata specifying the complex data type, the fields of the complex data type, and the columns of the table to which the fields have been mapped.

10. The database management system of claim 1, wherein the processor is to executer the program code to further:
generate an optimized query for a query specifying one or multiple of the complex data types, the optimized query specifying the columns to which the fields specified within the query are mapped, instead of specifying the fields; and
process the optimized query against the database in a late materialization manner to fulfill the query and to return results obtained by processing the optimized queries.

11. A non-transitory computer-readable data storage medium storing program code executable by a database management system to perform processing comprising:
receiving a query specifying a complex data type of data stored in a table of a columnar database in which the complex data type has been encoded over columns of the table by mapping of fields of the complex data type to the columns, each column having a primitive data type native to the database;
decomposing the fields specified within the query into the columns of the database to which the fields are mapped; and
generating an optimized query for the received query, the optimized query specifying the columns to which the fields specified within the query have been decomposed, instead of specifying the fields
wherein the complex data type comprises a first structure data type specifying a first array of elements having a second structure data type specifying a second array of elements having the primitive data type, the fields comprising an array field corresponding to the second array of elements,
and wherein the primitive data type of a column to which the array field is mapped is the primitive data type of the second array of elements.

12. The non-transitory computer-readable data storage medium of claim 11, wherein decomposing the fields specified within the query into the columns of the database to which the fields are mapped comprises, for each field specified within the query, inspecting metadata for the complex data type to identify the columns of the database over which the field has been mapped.

13. The non-transitory computer-readable data storage medium of claim 11, wherein generating the optimized query comprises specifying within the optimized query a combination of the columns to which the fields specified within the query are mapped.

14. The non-transitory computer-readable data storage medium of claim 11, wherein generating the optimized query comprises ordering the columns within the optimized query according to an order that the complex data type specifies the fields to which the columns are mapped.

15. The non-transitory computer-readable data storage medium of claim 11, wherein the query specifies comparisons of the fields,
and wherein generating the optimized query comprises linking comparisons of the columns within the optimized query by logical operators in accordance with the comparisons of the fields within the query.

16. The non-transitory computer-readable data storage medium of claim 11, wherein the processing further comprises:
processing the optimized query against the database in a late materialization manner to fulfill the query; and
returning results obtained from processing the optimized queries.

17. A method comprising:
processing, by a database management system having a columnar database, an optimized query against the database in a late materialization manner to fulfill a query specifying a plurality of complex data types, including first and second complex data types, of data stored in a table of a columnar database in which the complex data type has been encoded over columns of the table by mapping fields of the complex data type to the columns; and
returning, by the database management system, results obtained from processing the optimized query, to fulfill a query to which the optimized query pertains,
wherein the first complex data type comprises a first structure data type specifying a first array of elements having a second structure data type specifying a second array of elements having a primitive data type, the fields comprising a first array field corresponding to the second array of elements,
and wherein the primitive data type of a column to which the first array field is mapped is the primitive data type of the second array of elements,
wherein the second complex data type comprises an array data type specifying a third array of elements having the primitive data type, the fields comprising a second array field corresponding to the third array of elements,
and wherein the primitive data type of the column to which the second array field is mapped is the primitive data type of the third array of elements.

18. The method of claim 17, wherein the optimized query specifies the columns to which the fields specified within the query are mapped instead of specifying the fields,
and wherein the database management system processes the optimized query in the late materialization manner by delaying materialization of each column until the columns is needed during processing of the optimized query.

19. The method of claim 17, wherein the primitive data type is a first primitive data type, the first structure data type further specifies a plurality of second primitive data types, the fields comprising a plurality of primitive fields of the second primitive data types,
and wherein, for each primitive field, the primitive data type of the column to which the primitive field is mapped is the second primitive data type of the primitive field.

20. The method of claim 19, wherein the primitive fields are first primitive fields,
wherein the first structure data type further specifies a second structure data type specifying a plurality of third primitive data types, the fields comprising a plurality of second primitive fields of the third primitive data types,
and wherein, for each second primitive field, the primitive data type of the column to which the second primitive field is mapped is the third primitive data type of the second primitive field.

* * * * *